(12) United States Patent
Chung et al.

(10) Patent No.: US 10,699,162 B2
(45) Date of Patent: Jun. 30, 2020

(54) METHOD AND SYSTEM FOR SORTING AND IDENTIFYING MEDICATION VIA ITS LABEL AND/OR PACKAGE

(71) Applicants: MacKay Memorial Hospital, Taipei (TW); National Taiwan University of Science and Technology, Taipei (TW)

(72) Inventors: Sheng-Luen Chung, Taipei (TW); Chih-Fang Chen, Taipei (TW); Jing-Syuan Wang, Taipei (TW)

(73) Assignees: MACKAY MEMORIAL HOSPITAL, Taipei (TW); NATIONAL TAIWAN UNIVERSITY OF SCIENCE AND TECHNOLOGY, Taipei (TW)

(*) Notice: Subject to any disclaimer, the term of this patent is extended or adjusted under 35 U.S.C. 154(b) by 99 days.

(21) Appl. No.: 16/048,446

(22) Filed: Jul. 30, 2018

(65) Prior Publication Data

US 2020/0034658 A1 Jan. 30, 2020

(51) Int. Cl.
| | |
|---|---|
| *G06K 9/00* | (2006.01) |
| *G06K 9/62* | (2006.01) |
| *G06K 9/32* | (2006.01) |
| *A61J 1/03* | (2006.01) |
| *G06T 7/13* | (2017.01) |
| *G06T 7/73* | (2017.01) |
| *G06T 5/00* | (2006.01) |

(52) U.S. Cl.
CPC ......... *G06K 9/6255* (2013.01); *G06K 9/3208* (2013.01); *G06K 9/3216* (2013.01); *A61J 1/035* (2013.01); *G06T 5/002* (2013.01); *G06T 7/13* (2017.01); *G06T 7/74* (2017.01)

(58) Field of Classification Search
None
See application file for complete search history.

(56) References Cited

U.S. PATENT DOCUMENTS

| | | | | |
|---|---|---|---|---|
| 2014/0067114 | A1* | 3/2014 | Apell | G07F 11/68 700/244 |
| 2015/0169829 | A1* | 6/2015 | Jaynes | G06K 9/18 705/3 |
| 2015/0302255 | A1* | 10/2015 | Gershtein | G06K 9/4604 382/128 |

\* cited by examiner

*Primary Examiner* — Suhail Khan

(57) ABSTRACT

Disclosed herein is an improved pharmaceutical management system and methods implemented by the system for sorting and identifying a medicine via its label and/or package. The method comprises steps of: (1) receiving a plurality of raw images of a package of a medication; (b) juxtaposing two of the plurality of raw images to produce a combined image, in which the two raw images are different from each other; (c) processing the combined image to produce a reference image; and (d) establishing the medication library with the aid of the reference image. The system comprises an image capturing device, an image processor, and a machine learning processor. The image processor is programmed with instructions to execute the method for producing a combined image.

17 Claims, 4 Drawing Sheets

METHOD AND SYSTEM FOR SORTING AND IDENTIFYING MEDICATION VIA ITS LABEL AND/OR PACKAGE

BACKGROUND OF THE INVENTION

1. Field of the Invention

The present disclosure in general relates to the field of pharmaceutical management systems. More particularly, the present disclosure relates to method and system for sorting and identifying a medicine via its label and/or package.

2. Description of Related Art

An efficient storage and managing system and/or method of medical supplies and pharmaceutical products is an important prerequisite for the smooth operation of a hospital system, as well as for providing high quality patient care. In such case, accuracy for dispensing a prescription is of paramount importance for all medical institutions. Though automated dispensing cabinets (ADCs) have been introduced into hospitals for over 20 years, yet, pharmacy errors still exist. As administering medication by ADCs relies heavily on precise adherence to standard protocols by clinical staff, thus it is impossible to completely eliminate the final human errors. For instance, pharmacy may stock the wrong medication in a given drug cabinet, or a clinician may pick a "look-alike" medication from an adjacent drug drawer. Therefore, identifying medications via their appearances with human eyes is not reliable, nor can it be applied to medication management systems.

Deep learning methods is part of a broader family of machine learning methods based on learning data representations with multiple levels, which are obtained by composing simple but not-linear modules that each transforms the representation at one level into a representation at a higher, slightly more abstract level. With the composition of enough such transformations, complex functions such as classification tasks can be learned. Therefore, deep learning is making major advances in solving problems existing in the artificial intelligence community for many years and are being applied to many technical fields. As for pharmaceutical management, the superior performance of deep learning in identifying appearances of objects seems to be a promising solution for the shortcomings of current drug dispensing technologies. However, considering massive types of medicine packages with certain appearance similarity involved, simply practicing deep learning failed to produce desirable outcome.

In view of the foregoing, there exists in the related art a need for an improved method and system for medication management (e.g., sorting and identifying medications via their labels and/or package).

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, the purpose of the present disclosure is to provide an improved pharmaceutical management system and methods implemented by the system for identifying clinical drugs, such that the efficiency and accuracy in dispensation of medication can be highly improved.

In one aspect, the present disclosure is directed to a computer implemented method for building a medication library. In some embodiments, the method comprises: (a) receiving a plurality of raw images of a package of a medication; (b) juxtaposing two of the plurality of raw images to produce a combined image, in which the two juxtaposed raw images are different from each other; (c) processing the combined image to produce a reference image; and (d) establishing the medication library with the aid of the reference image.

In some optional embodiments, the method further comprises a step of capturing the plurality of raw images of the package of the medication simultaneously prior to the step (a).

According to certain embodiments of the present disclosure, preferably, the medication is in the form of a blister package.

According to certain embodiments of the present disclosure, the step (b) comprises: (b-1) respectively processing the plurality of raw images to produce a plurality of first processed images respectively having defined contours; (b-2) identifying the corners of each defined contours of the first processed images to determine the coordinates thereof; (b-3) rotating each of the first processed images of the step (b-1) based on the determined coordinates of the step (b-2) to produce a plurality of second processed images; and (b-4) combining any two of the second processed images to produce the combined image of the step (b).

According to certain embodiments of the present disclosure, the each of the plurality of raw images of step (b-1) are subjected to treatments of (i) a grayscale-converting treatment, (ii) a noise-reduction treatment, (iii) an edge-identification treatment, (iv) a convex hull treatment, and (v) a contouring treatment.

According to embodiments of the present disclosure, each treatments (i) to (v) may be performed independently in any sequence; and in each treatments (i) to (v), the raw images of the step (b-1) or images treated by any of said treatments (i) to (v) other than the current treatment are used.

In some embodiments of the present disclosure, the step (b-2) is carried out by a line transforming algorithm or a centroid algorithm.

Preferably, the aforementioned combined image has the image of both sides of the blister package of the medication.

According to some embodiments of the present disclosure, the step (c) is carried out by a machine learning algorithm.

In another aspect, the present disclosure pertains to a computer implemented method for identifying a medication via its blister package. The method comprises: (a) obtaining the front and back images of the blister package of the medication simultaneously; (b) juxtaposing the front and back images of the step (a) to produce a candidate image; (c) comparing the candidate image with a reference image of a medication library established by the aforementioned method; and (d) outputting the result of the step (c).

According to certain embodiments of the present disclosure, the step (b) comprises: (b-1) respectively processing the front and back images to produce two first processed images respectively having defined contours; (b-2) identifying the corners of each defined contours of the two first processed images to determine the coordinates thereof; (b-3) rotating each of the two first processed images of the step (b-1) based on the determined coordinates of the step (b-2) to produce two second processed images; and (b-4) combining the two second processed images of the step (b-3) to produce the candidate image of the step (b).

According to certain embodiments of the present disclosure, the front and back images of step (b-1) are respectively subjected to treatments of: (i) a grayscale-converting treatment, (ii) a noise-reduction treatment, (iii) an edge-identification treatment, (iv) a convex hull treatment, and (v) a contouring treatment.

In some embodiments, each treatments (i) to (v) may be performed independently in any sequence; and in each treatments (i) to (v), the front and back images of the step (b-1) or images treated by any of said treatments (i) to (v) other than the current treatment are used.

In some optional embodiments, the step (b-2) is carried out by a line transforming algorithm or a centroid algorithm.

In some optional embodiments, the step (d) is carried out by a machine learning algorithm.

In some optional embodiments, the method further comprises a step of transferring the candidate image into the medication library prior to the step (c).

In yet another aspect, the present disclosure is directed to a pharmaceutical management system, which includes an image capturing device, an image processor, and a machine learning processor, configured to implement the present method.

More specifically, the image capturing device is configured to capture a plurality of images of a package of a medication. The image processor is programmed with instructions to execute a method for producing a candidate image, in which the method comprises: (1) respectively processing the plurality of images of the package of the medication to produce a plurality of first processed images respectively having defined contours; (2) identifying the corners of each defined contours of the first processed images to determine the coordinates thereof; (3) rotating each of the first processed images based on the identified coordinates of the step (2) to produce a plurality of second processed images; and (4) juxtaposing two of the second processed images of the step (3) to produce the candidate image, in which the two second processed images are different from each other. In addition, the machine learning processor is programmed with instructions to execute a method for comparing the candidate image with a reference image of the aforementioned medication library. The result produced by the machine learning processor may subsequently be outputted to notify an operator, whom is dispensing the medication.

In some embodiment of the present disclosure, the image capturing device comprises a transparent board on which the medication is placed and two image-capturing units individually disposed above each side of the transparent board.

In some embodiment of the present disclosure, each of the plurality of images of the step (1) are subjected to treatments of: (i) a grayscale-converting treatment, (ii) a noise-reduction treatment, (iii) an edge-identification treatment, (iv) a convex hull treatment, and (v) a contouring treatment.

In some embodiments, each treatments (i) to (v) may be performed independently in any sequence; and in each treatments (i) to (v), the plurality of images of the step (1) or images treated by any of said treatments (i) to (v) other than the current treatment are used.

Additionally or alternatively, said step (2) may be carried out by a line transforming algorithm or a centroid algorithm.

In some optional embodiments, the method for comparing the candidate image with a reference image of the aforementioned medication library is carried out by a machine learning algorithm.

By virtue of the above configuration, the medication management method and system for sorting and identifying can be executed in a real-time manner, thereby shortening the whole processing time of image classification regardless of the orientation of medications during drugs dispensation.

Furthermore, the accuracy of drug identification via their appearance and/or blister packages can be increased, and man-made mistakes during medication dispensing can be greatly reduced. Therefore, medication-use safety could be improved.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1:
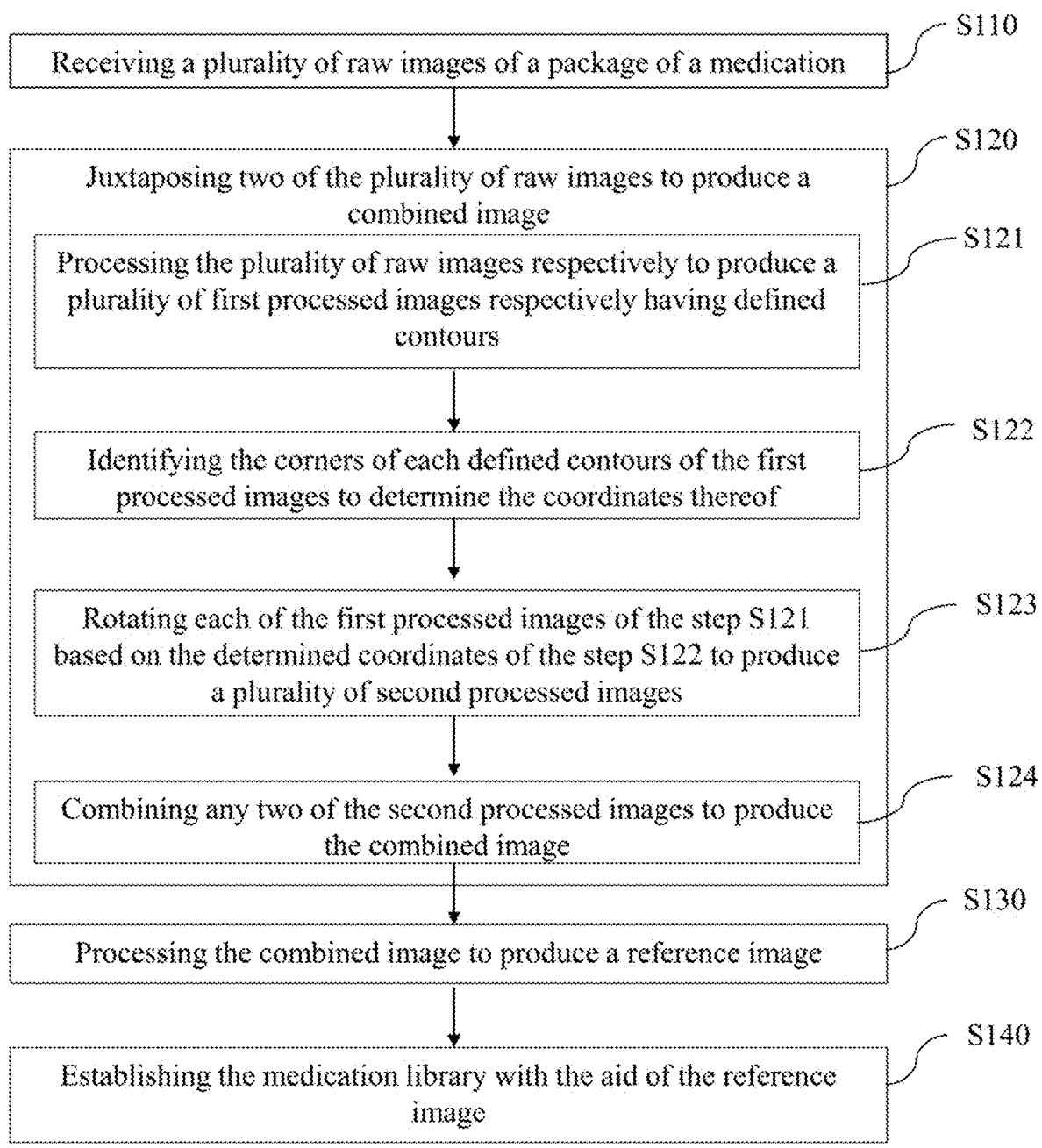
FIG. 1 is a flow chart illustrating a method 100 according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

As used herein, the term "blister pack" or "blister package" encompasses any type of layered package comprising a product contained between sheets of material; wherein the sheets are adhered or sealed together by methods known to those skilled in the art; for example, the sheets are sealed by heat and/or pressure activated adhesive. The sheets of material are commercially available as individual sheets (for hand packaging) or, preferably, as a continuous web sheet on roll stock (for machine packaging). The primary component of a blister package is a cavity or pocket made from a formable web, usually a thermoformed plastic. The cavity or pocket is large enough to contain the good which is housed in the blister package. Depending on the application, a blister pack may have a backing of thermoformable material. For pharmaceutical fields, "blister packages" are commonly used as unit-dose packaging for pharmaceutical tablet, and contain drug information printed on the back thereof. In addition, the sheets are available in a variety of thicknesses.

II. Description of the Invention

What is most concerned in patient care is medication-use safety. Filling prescription and dispensing medicines correctly is of paramount importance for patient care. Since the conventional automated dispensing systems, such as ADCs, still has room for improvement, this invention aims to provide an improved, highlighted deep learning method that addresses the afore-mentioned issue. Furthermore, the present invention also aims to develop an automatic medication verification (AMV) apparatus in a real-time operating system so as to reduce the workload of clinical stuff.

More specifically, the "highlighted" deep learning method refers to a method of processing and highlighting features or images before inputting them into algorithms, such that the feature information can be learned in a more emphasized manner. Generally, in order to better divide the identified targets and to expose inherent descriptive features, the feature processing is achieved by various image-processing steps which lead to conjugate both cropped pictures of blister package appearance into a fixed signature template, thereby facilitating the subsequent classification process in learning networks.

1. Method for Building Mediation Library

The first aspect of the present disclosure is directed to a method for building a medication library implemented in a computer-readable storage medium. References are made to FIG. 1.

Referring to FIG. 1, which is a flow chart of a method 100 implemented on a computer according to one embodiment of the present disclosure. The method comprises at least the following steps, (S110) receiving a plurality of raw images of a package of a medication;

(S120) juxtaposing two of the plurality of raw images to produce a combined image, in in which the two raw images are different from each other;

(S130) processing the combined image to produce a reference image; and (S140) establishing the medication library with the aid of the reference image.

Before the method 100 is implemented, a plurality of raw images of a medication package (e.g., a blister package) are captured by any well-known manners, such as an image capturing devices (e.g., video camera). Then, in the step S110 of the present method, the captured images are automatically forwarded to a device and/or system (e.g., a computer) having instructions embedded thereon for executing the present method 100. In the following step S120, two of the plurality of raw images received by such device and/or system are juxtaposed to each other to produce a combined image. It is worth noting that the two juxtaposed raw images are different from each other. In one exemplary embodiment, the medication is in the form of a blister package; hence, the plurality of raw images taken by the image capturing device may encompass both sides of the blister package. In other words, two images respectively showing the front and back of the blister package are juxtaposed to each other to produce a combined image. In order to improve the accuracy of appearance recognition for the subsequent machine learning process, the raw images are highlighted and processed to give a neat image having a pre-determined feature (e.g., in a pre-determined pixels size, etc.), in which all background portions other than the main object (i.e., the image of blister package and/or labels) is completely removed.

In the step S130, the combined images are then used to train a machine learning algorithm embedded in the computer (e.g., a processor) to produce a reference image. The steps S110 to S130 may be repeated many times, each time using a medication package different from the one before. Eventually, a medication library can be established with the aid of the reference image (the step S140).

Returning to the step S120, which generally includes the following steps, (S121) respectively processing the plurality of raw images to produce a plurality of first processed images respectively having defined contours;

(S122) identifying the corners of each defined contours of the first processed images to determine the coordinates thereof;

(S123) rotating each of the first processed images of the step S121 based on the determined coordinates of the step S122 to produce a plurality of second processed images; and (S124) combining any two of the second processed images to produce the combined image of the step S120.

In the step S121, the plurality of raw images are respectively processed by an image processor to eventually produce a plurality of first processed images respectively having well defined contours. The image processor employs several algorithms to eliminating background noises and extracting target features from the images. Specifically, each of the plurality of raw images of the step S121 are respectively subjected to treatments of: (i) a grayscale-converting treatment, (ii) a noise-reduction treatment, (iii) an edge-identification treatment, (iv) a convex hull treatment, and (v) a contouring treatment. It is worth noting that each treatments (i) to (v) are performed independently in any sequence.

More specifically, (i) the grayscale-converting treatment is executed by use of a color-converting algorithm to change BGR colors into gray-scale (S1211); (ii) the noise-reduction treatment is executed by use of a filter algorithm to minimize the background noise (S1212); (iii) the edge-identification treatment is executed by use of an edge identifying algorithm to determine the coordinates of each edges of the blister package in the image (S1213); (iv) the convex hull treatment is executed by use of convex hull algorithm to calculate the actual area of the blister package of the medication in the image (S1214); and (v) the contouring treatment is executed by use of a contour defining algorithm to extract and highlight the main portion of the blister package (S1215).

According to certain embodiments, the raw images in the step S121 are subjected to all of the treatments (i) to (v) before proceeding to the step S122. As mentioned before, these treatments may be performed independently in any order, hence except the raw images form the step S121, images derived from one treatment can be the raw images in the next treatment. For example, the raw images of the step S121 are first subjected to the treatment (i) or step S1211, in which BGR colors of the raw image are converted to grayscale, thereby generating a greyscale image. This grayscale image derived from the treatment (i) may continue to be treated with any of treatments (ii) to (v), until all treatments (i) to (v) have been successfully applied thereon, thereby generating a first processed image having defined contours.

Alternatively, or optionally, the raw images of the step S121 are first subjected to treatment (iv) or step S1214, in which a convex hull algorithm is applied thereon. The convex hull algorithm is to find the convex hull of a finite set of points in the plane or other low-dimensional Euclidean spaces. In the present disclosure, the convex hull is defined by calculating the actual area of the blister package of the medication in the image. The image derived from treatment (iv) or step S1214 may then be treated with any treatments of (i), (ii), (iii) or (v), until all treatments (i) to (v) have been successfully applied thereon, thereby generating a first processed image having defined contours.

It should be noted that the afore-indicated treatments (i) to (v) or steps S1211 to S1215 can be performed sequentially, randomly, and/or repeatedly (e.g., the treatment (iii) can be repeated one or more times); preferably, they are performed in the order of (i) to (v) or from the steps S1211 to S1215.

By performing the afore-mentioned steps S1211 to S1215, a plurality of first processed images, each having defined contours, are generated from the plurality of raw images, in which the background noise in the raw images is eliminated and the main portion of the blister package is extracted and highlighted for further image processing procedure.

Proceed to the step S122, in which the corners in each of the first processed images are identified FIG. 1). In this step, the coordinates of at least one corner of each of the first processed images are determined regardless of the profile shapes of the blister packages. Preferably, the coordinates of four corners of each of the first processed image derived from the step S121 are identified. The goal of this step is to project at least three straight lines from the profile edge of the blister package, then derive the closest quadrilateral shape and the corner coordinates thereof by geometric inference. As the blister package might come in various shapes and/or profiles, thus different algorithms may be adopted to identify the corner(s) from the first processed images of a medication package. For instance, if the contour shape of the medication package in the first processed image is regular quadrilateral (e.g., a rectangle), a line transforming algorithm is applied to identify the four corners. On the other hand, if the medication package in the first processed image is in irregular quadrilateral shape, such as the atypical polygon having three straight edges and one curved edge, then a centroid algorithm is applied for corner identification. By virtue of the above configuration, the coordinates of each corner can be determined regardless of the orientation and shapes of the medication packages.

Identifying the corners of each processed images in the step S122 not only serves the purpose of setting up anchor points for the execution of the subsequent rotating step (S123) and combining step (S124), but also the purpose of ensuring that the entire package is encompassed in the first processed image for further analysis. It is worth noting that the four corners of the blister package images determined above have to be arranged in clockwise or anticlockwise manner, such that the first processed images can be rotated into a predetermined position based on the determined coordinates of the four corners (S123). The predetermined position can vary based on practical requirements. In some instances, the predetermined position refers to the position in which the short and the long sides of the blister packages are respectively parallel with the X and Y axes in a Cartesian coordinate system. Preferably, the blister package is oriented in the manner that the image only needs to be rotated once to have its short and long sides respectively being parallel to the X and Y axes in a Cartesian coordinate system. In practice, several perspective transformation algorithms may be used to rotate the first processed images, which was set to have a pre-determined pixel sizes (e.g., 448×224 pixels), thereby produces the second processed (rotated) images with the predetermined position.

Next, in the step S124, any two of the second processed images of a medication are placed side by side (or juxtaposed to each other) and thereby produces a combined image. It is worth noting that the combined image obtained in this step can include various permutations, which is beneficial for building up the library database as much as possible. Two of the second processed images may be the opposite sides of the blister package regardless the fact that it has been inverted or not. Preferably, two of the second processed images respectively showing each sides of the blister package of the medication having the same orientation are selected and juxtaposed to each other to produce a combined image that encompasses maximum feature information of the package therein.

In the steps S130 and S140, the combined image is used to train a machine learning algorithm embedded in the computer to produce a reference image in the purpose of establishing the medication library. The combined image, which includes the medication information, is classified with its features stored as a reference information in the medication library and may be retrieved in the future for identifying a candidate package. In some embodiments, at least one combined image is inputted into the machine learning algorithm. In the exemplary embodiment, more than 10 to 20,000 combined images, such as 10, 100, 200, 300, 400, 500, 1000, 1,100, 1,200, 1,300, 1,400, 1,500, 2,000, 2,500, 3,000, 3,500, 4,000, 4,500, 5,000, 5,500, 10,000, 11,000, 12,000, 13,000, 14,000, 15,000, 16,000, 17,000, 18,000, 19,000 and 20,000 combined images are inputted to train the machine learning algorithm to establish the medication library. Every image can be used to train the machine learning system to transform the image information into the reference information, and the reference information is subsequently stored in the built-in library in the device and/or system.

It is worth noting that the machine learning programming system suitable for use in the present disclosure can be any well-known vision object detection models, which include but are not limited to, deformable parts model (DPM), region convolutional neutral network (R-CNN), Fast R-CNN, Faster R-CNN, Mask R-CNN and YOLO, with or without being optimized at certain criteria according to practical needs. Preferably, the vision object detection models suitable for training the learning step of the present disclosure are optimized, at least in parameters like pixels of the input images, numbers and sizes of bounding boxes, and anchor boxes. According to the present disclosure, the combined image processed by the above-mentioned steps and then inputted into the learning system must be "full bleed image" and in a pre-determined size (e.g., with fixed pixels). Therefore, the number and sizes of anchor boxes for operation can be minimized (e.g., minimized to only one anchor box) to enhance the computing speed and efficiency. In other words, by virtue of the afore-mentioned step for juxtaposing two images into one, the machine learning system can run smoothly and faster even when processing huge volumes of data of massive types of medicine packages. Furthermore, the entire processing time is shortened, which further enhance the efficacy in producing a medication library.

By performing the aforementioned steps S130 and S140, the training results for each distinct medication can be outputted as a classification model when the medication library is in practice.

2. Method for Identifying a Medication

A second aspect of the present disclosure is directed to a method for identifying a medication via its package (e.g., a blister package). References are made to FIG. 2.

Figure 2:
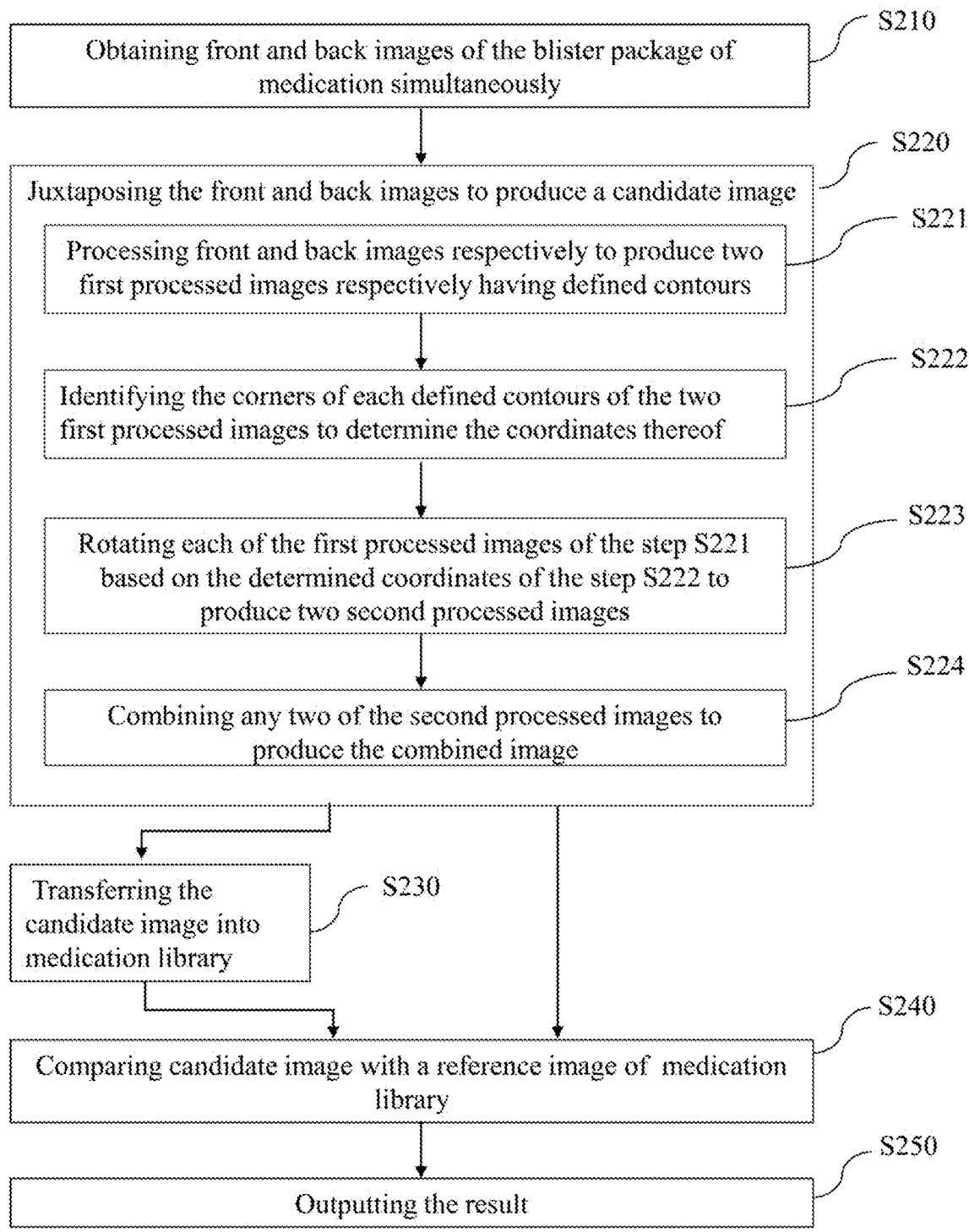
FIG. 2 is flow chart illustrating a method 200 according to one embodiment of the present disclosure.

Referring to FIG. 2, which is a flow chart illustrating a method 200 according to one embodiment of the present disclosure. The method 200 comprises steps of, (S210) obtaining the front and back images of the blister package of the medication simultaneously;

(S220) juxtaposing the front and back images of the step S210 to produce a candidate image;

(S230) optionally transferring the candidate image into the medication library;

(S240) comparing the candidate image with a reference image of a medication library established by the above-mentioned method; and (S250) outputting the result of the step S240.

Preferably, the method 200 can be implemented via a non-transitory processor-readable storage medium embedded with instructions for executing steps of the present method, as well as a medication library. The medication library can be originally stored and built-in or can be established by the afore-mentioned method 100.

In the image-receiving step (S210), two raw images of a medication are captured simultaneously. The two raw images are, preferably, individually each side of the blister package of the medication (i.e., the front and back images). The raw images can be obtained by any well-known manner and preferably by at least one image capturing devices (e.g., video camera). In one exemplary embodiment, the two raw images of the blister package are captured simultaneously by two image capturing devices disposed over two sides of the medication (e.g., the front and back of the medication); hence, the two raw images will encompass medication information on both sides of the blister package. To improve the accuracy of appearance recognition for the subsequent machine learning process, the two raw images obtained in the step S210 are juxtaposed right next to each other to produce a candidate image (the step S220). Like the method 100, the goal is to produce a neat image having a pre-determined feature (e.g., front and back images disposed side-by-side, in a pre-determined pixels size and etc.) without information other than the main object (i.e., only with the image of blister package and/or labels).

The candidate image produced in the step S220 is then compared with reference images stored in the medication library (S240), and the result (i.e., drug information for the certain medication) is outputted to a user (S250). The step S220 may be performed at the same or different computing device for executing the steps S210, S240 and S250. According to optional embodiments of the present disclosure, the step S220 is executed at a computing device different from the one for executing the steps S210, S240 and S250, accordingly, an optional step S230 is performed, in which the processed image or the candidate image produced in the step S220 is transferred to the computing device where the steps S240 and S250 are to be performed.

Returning to the step S220, which is similar to the step S120 of the method 100, and generally includes steps of (S221) processing the front and back images to produce two first processed images respectively having defined contours;

(S222) identifying the corners of each defined contours of the two first processed images to determine the coordinates thereof;

(S223) rotating each of the two first processed images of the step S221 based on the determined coordinates of the step S222 to produce two second processed images; and (S224) combining the two second processed images of the step S223 to produce the candidate image.

In the step S221, the front and back images are respectively processed by an image processor to produce a plurality of first processed images, in which each processed image has a well-defined contour. To this purpose, the front and back images of the step S221 are respectively subjected to treatments of: (i) a grayscale-converting treatment, (ii) a noise-reduction treatment, (iii) an edge-identification treatment, (iv) a convex hull treatment, and (v) a contouring treatment. It is worth noting that treatments (i) to (v) are performed independently in any sequence. In practice, several well-known algorithms may be used to eliminating background noises and extracting target features from the two raw images.

More specifically, (i) the grayscale-converting treatment is executed by use of a color-converting algorithm (S2211); (ii) the noise-reduction treatment is executed by use of a filter algorithm to minimize the background noise (S2212); (iii) the edge-identification treatment is executed by use of an edge identifying algorithm to determine the coordinates of each edges of the blister package in the image (S2213);

(iv) the convex hull treatment is executed by use of convex hull algorithm to calculate the actual area of the blister package of the medication in the image (S2214); and (v) the contouring treatment is executed by use of a contour defining algorithm to extract and highlight the main portion of the blister package (S2215).

In practice, the raw images in the step S221 are subjected to all treatments (i) to (v) before the method proceeding to the step S222. As mentioned before, these treatments can be performed in any order, hence the raw images obtained in the step S221 or the image derived from one treatment are used in the next treatment. For example, the raw images of the step S221 are first subjected to the treatment (i) or step S2211, in which BGR colors of the raw image are converted to grayscale, thereby generating a greyscale image. This grayscale image derived from the treatment (i) may continue to be treated with any of treatments (ii) to (v), until all treatments (i) to (v) have been successfully applied thereon, thereby generating a first processed image having defined contours.

Alternatively, or optionally, the raw images of the step S221 are first subjected to treatment (iv) or step S2214, in which a convex hull algorithm is applied thereon. The convex hull algorithm is to find the convex hull of a finite set of points in the plane or other low-dimensional Euclidean spaces. In the present disclosure, the convex hull is defined by calculating the actual area of the blister package of the medication in the image. The image derived from treatment (iv) or step S2214 may then be treated with any treatments of (i), (ii), (iii), or (v), until all treatments (i) to (v) have been successfully applied thereon, thereby generating a first processed image having defined contours.

In one preferable embodiment, treatments are performed sequentially from step S2211 to the step S2215. The strategies and algorithms utilized in steps S2211 to S2215 are similar to those described in the step S121, therefore they are not reiterated herein for the sake of brevity.

As would be appreciated, each step of S2212 to S2215 may be executed by any alternative algorithm well-known in the art, as long as the algorithm achieves the same results described above.

By performing the steps S2211 to S2215, two first processed images respectively having defined contour are generated from the two raw images (i.e., the front and back images taken from the blister package of one medicines), in which the background noise in the raw images is eliminated and the main portion of the blister package is extracted and highlighted for further image processing procedure.

Proceed to the steps S222 to S224, the goals of these steps are the same as that in steps S122-S124. In the step S222, at least three straight lines of the profile edge of the blister package are determined, then the closest quadrilateral shape and the corner coordinates thereof are derived by geometric inference. Once the step S222 for identifying corners is accomplished, the step S223 could be performed based on the determined coordinates to produce two processed, highlighted images in a fixed signature template. In the step S224, the two processed images are juxtaposed side by side and are combined into one image, so as to produce a candidate image containing information on both sides of the package of the medication. The strategies utilized in the step S220 are similar to those described in the method 100, therefore they are not reiterated herein for the sake of brevity.

In the step S240, the combined image or the candidate image is then compared with reference images stored in the medication library, so as to determine the identity of the medication. In some embodiments, the medication library is stored in the same computing device or in other processor-readable storage medium different from the one having instructions for executing the step S220. According to optional embodiment of the present disclosure, the candidate image is produced in a first processor unit embedded with instructions for executing the step S220, and the processed image is then transferred to the medication library (e.g., the medication library built by the method 100 described above) located at a second processing unit. The step S240 is executed under a machine learning instruction embedded in the storage medium to compare the candidate image with reference images of the medication library, and the result (either matched or un-matched) is then outputted to a user. If the comparison indicates that the candidate image matches or has a highest similarity to a certain reference image in the medication library, then the information of that medication corresponding that certain reference image is outputted. If the comparison fails to produce a matching result between the candidate image and all reference images in the library, then a notion indicating "no matched result" is outputted.

As mentioned above, the purpose of the machine learning algorithm is to improve visual recognition of a medication. In some embodiments, the exemplary algorithm can be deep learning algorithm executed under any well-known vision object detection models with or without being optimized at certain criteria according to practical needs. In one exemplary embodiment, the deep learning is executed under the optimized detection model. In another exemplary embodiment, the candidate image processed by the present method must be "full bleed image" and in a pre-determined pixels size (e.g., 448×224 pixels); hence, it is possible to keep the parameters for the operation of machine learning at a minimum level, thereby enhances the computing speed and efficiency.

It is worth noting that, by juxtaposing two processed images into one image that termed "combined image", the present machine learning system and/or method can run smoothly and faster even when processing huge volumes of data for massive types of medicine packages. In other words, the processed and highlighted image in fact increases the computing efficiency and accuracy. By virtue of the above technical features, the present method 200 aims at identifying a medication via its blister package can enhance the accuracy of medicine identification and significantly eliminate human errors during medication dispensing, thereby improves safety in medication usage and the quality in patient care.

The subject matter described herein could be implemented using a non-transitory, tangible processor-readable storage medium having stored thereon processor-readable instructions that, when executed by the processor of a programmable device, control the programmable device to perform a method according to embodiments of the present disclosure. Exemplary processor-readable storage media suitable for implementing the subject matter described herein include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, and any other medium which can be used to store the desired information and which can be accessed by the processor. In addition, a processor-readable storage medium that implements the subject matter described herein may be located on a single device or computing platform or may be distributed across multiple devices or computing platforms. In some embodiments, the computing platform is an embedded system with real-time computing constrains.

3. Pharmaceutical Management System

Figure 3:
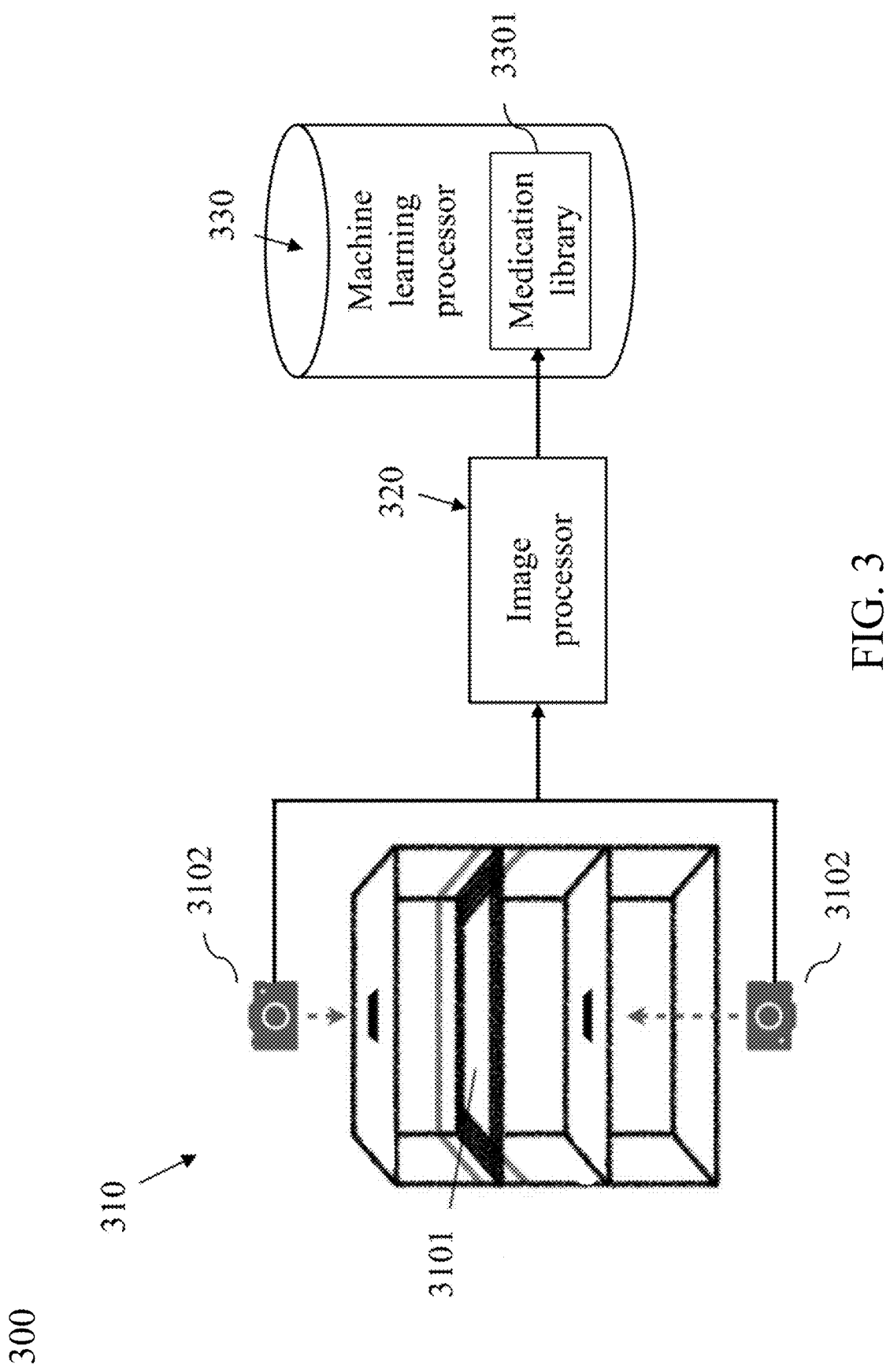
FIG. 3 is a diagram illustrating a pharmaceutical management system 300 according to another embodiment of the present disclosure.

In another aspect of the subject matter described herein, a pharmaceutical management system is provided. Referring to FIG. 3, a system 300 is depicted, which comprises an image capturing device 310, an image processor 320 and a machine learning processor 330, in which the image capturing device 310 and the machine learning processor 330 are respectively coupled to the image processor 320. The image capturing device 310 is configured to capture a plurality of images of a package of a medication. In some embodiments, the image capturing device 310 comprises in its structure, a transparent board 3101, and two image capturing units 3102 individually disposed over each side of the transparent board, which can be made by glass or acrylate polymers. In practical, the medication is placed on the transparent board 3101, and images of both sides of the medication package are captured simultaneously by the two image capturing units 3102. Exemplary, the two image capturing units 3102 are real-time digital cameras.

According to the present disclosure, unless otherwise indicated, the image processor 320 and the machine learning processor 330 respectively encompass memories for storing a plurality of instructions that would cause the processors to implement the present method(s). In some embodiments, the image processor 320 and the machine learning processor 330 are disposed separately as two individual devices; alternatively, they may be disposed in the same hardware. In some embodiments, the image processor 320 and the machine learning processor 330 are communicatively connected to each other. More specifically, the image processor 320 is communicatively connected with the image capturing device 310 to receive images captured by the image capturing device 310 and configured to execute image processing steps (such as steps S120 and S220) of the present methods thereby producing a candidate image for further identification. The machine learning processor 330 is communicatively connected with the image processor 320 and configured to implement image comparison (such as the step S240) of present method for medication identification. The step comprises comparing the candidate image with a reference image in the medication library established by the present method. The medication library is communicatively connected with the machine learning processor 330. In the exemplary embodiment depicted in FIG. 3, the present medication library 3301 is stored in the machine learning processor 330. Alternatively or optionally, the medication library may be stored in storage devices connected with the machine learning processor 330 through cable connection or wireless network.

In some embodiments, the system 300 further comprises a user interface (not shown) configured to output results of medication identification, receive instructions from an external user, and retrieve user inputs back to the image processor 320 and the machine learning processor 330.

The communication among the image capturing device 310, the image processor 320 and the machine learning processor 330 may be embodied using various techniques. For instance, the present system 300 may comprise a network interface to permit communications among the image capturing device 310, the image processor 320, and the machine learning processor 330 over a network (such as a local area network (LAN), a wide area network (WAN), the Internet, or a wireless network). In another example, the system may have a system bus that couples various system components including the image capturing device 310 to the image processor 320.

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

Example

Example 1 Constructing Medication Library

Preparing Rectified Two-Sided Images (RTIs)

Over 250 medications currently available on the market were collected from the department of hospital pharmacy in Mackay Memorial Hospital (Taipei, Taiwan). Pictures of blister packages of all medications were taken as many as possible for constructing a database of the medication library. Images were cropped to minimize background noises and processed to generate multiple combined images (also called "rectified two-sided images (RTIs)") for each medication by utilizing Open Source Computer Vision 2 (OpenCV 2) functions programmed in an image processor. Each RTI was fitted in a pre-determined template (hereinafter, the rectified two-sided template, RTT) and encompassed both sides of a blister package of one medication. Total 18,000 RTIs were obtained for further deep learning process by utilizing a CNN model.

Strategies for Detecting Corner of Irregular Quadrilateral Shapes of Medication Packages In the case that the medication package to be detected has an irregular quadrilateral shape, which is constituted by three straight edges and one curved edges, the centroid algorithm (Table 1) was utilized to determine the curved edge and the undefined corners by geometric inference.

TABLE 1

The centroid algorithm for corner detection in irregular quadrilateral shape

Figure 4:
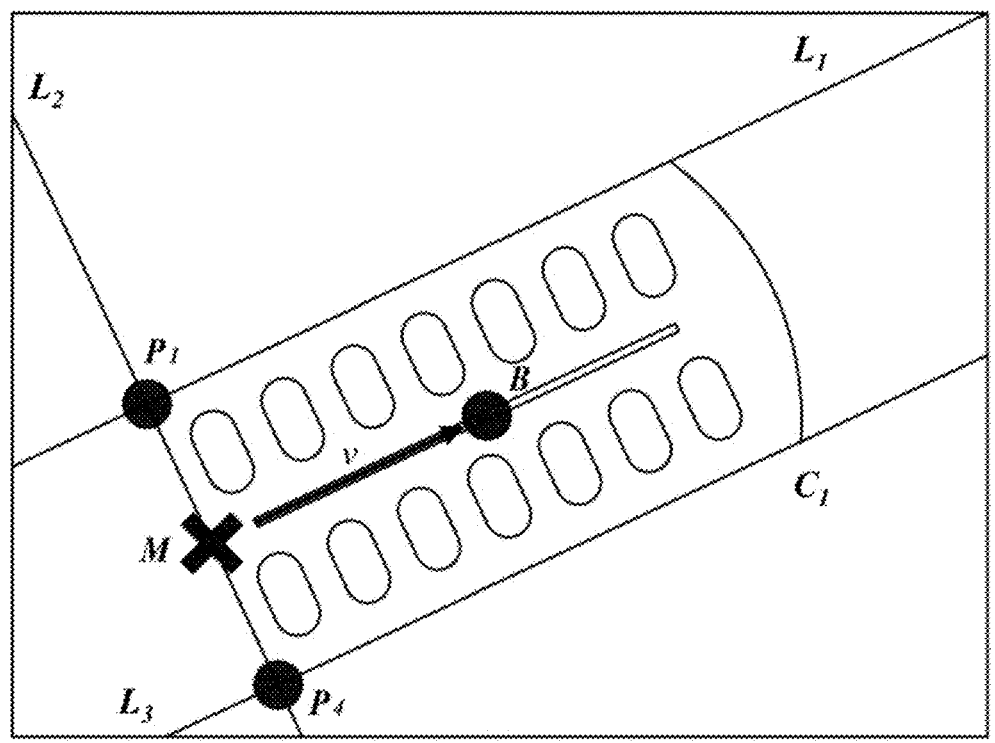
FIG. 4 are schematic drawings depicting how the corners of a package are identified via use of a centroid algorithm according to one example of the present disclosure.
Figure 4:
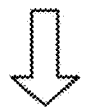
Figure 4:
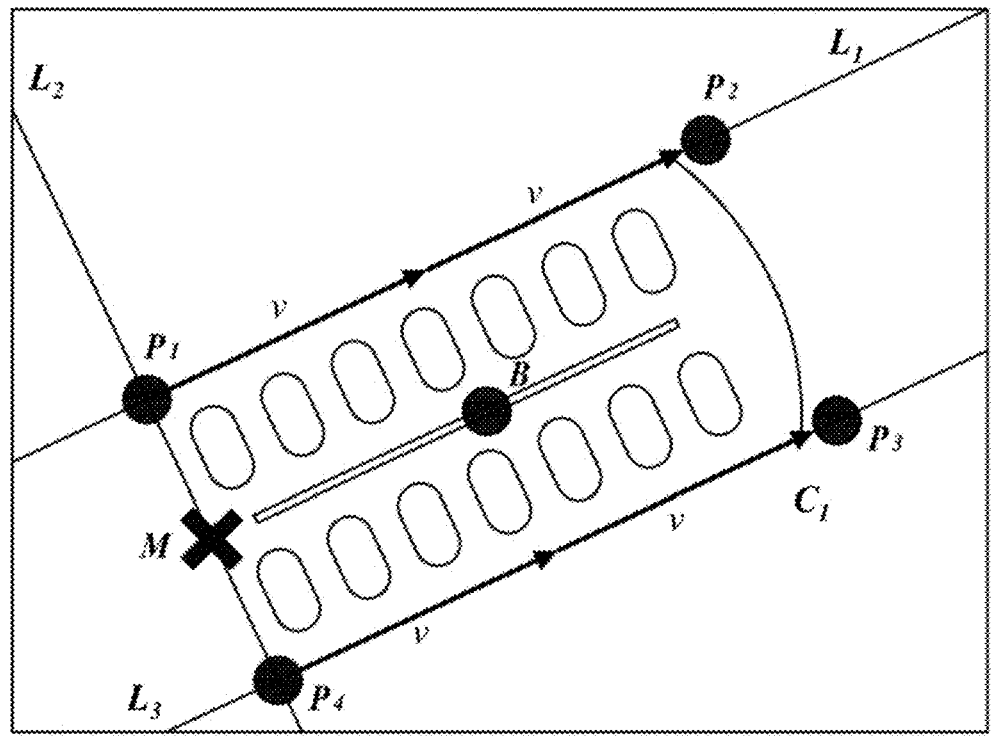

Input: Three edge lines L and the profile shape of the blister package blisterContour
Output: Four corners $P_1$, $P_2$, $P_3$ and $P_4$ in cyclic order via lines intersection and geometric inference
1:    procedure FINDCORNERS(L, blisterContour)
2:        $P_1$, $P_4$ ← Two intersection points of three lines in L.
3:        M ← The midpoint between two intersection points $P_1$, $P_4$.
4:        B ← The barycenter of the blister's contour blisterContour.
5:        $\vec{V}$ ← The displacement vector from M to B.
6:        $P_2$ ← $P_1 + 2\vec{V}$
7:        $P_3$ ← $P_4 + 2\vec{V}$ Referring to FIG. 4, which exemplarily shows how corner identification was performed on a medication package having an irregular quadrilateral shape. As depicted in FIG. 4, a blister package having three straight edges ($L_1$, $L_2$, $L_3$) and one curved edge ($C_1$) was in a random orientation, in which the intersection of $L_1$ and $L_2$ was designated as $P_1$, and the intersection of $L_2$ and $L_3$ was designated as $P_4$. The goal was to determine the coordinates of $P_2$ and $P_3$, so that the area enclosed by the 4 pints ($P_1$, $P_2$, $P_3$ and $P_4$) and 4 edges ($L_1$, $L_2$, $L_3$ and $C_1$) would encompass the image of the entire package. The mid-point M between $P_1$ and $P_4$ on the edge $L_2$ was first determined, and the centroid B of the area of the blister package was determined by the algorithm cv2.moments (OpenCV 2). The displacement vector v was then calculated based on the coordinates of the mi-point M and centroid B. Finally, the coordinates of $P_2$ and $P_3$ were determined to be the locations that are respectively two times of the distance v from $P_1$ and $P_4$. By virtue of the above procedure, the four points or corners of $P_1$, $P_2$, $P_3$ and $P_4$ would automatically be oriented in a clockwise or anti-clockwise manner.

Optimizing Machine Learning Ability

In this example, the aim of machine learning was achieved by use of Convolutional Neural Network (CNN). To this purpose, a tiny version YOLOv2 (as known as Tiny YOLO) Neural executed by graphics processing unit (GPU) were utilized to train visual recognition for each RTI. The general concept of the conventional YOLOv2 is to divide one image into multiple grid cells and uses anchor boxes to predict bounding boxes. Briefly, RTI images, each having 416×416-pixel sizes, were inputted to the network, in which Tiny YOLOv2 Neural then produced an odd number of grid cells in each images; accordingly, there would be only one grid cell in the center (i.e., the center grid cell). Each grid cells and its neighboring grid cells were then analyzed to determine if they contained any feature information. For example, an input image can be divided into 13×13 grid cells, in which bounding boxes with 5 sizes may be predicted, and the confidence score returned by each grid cell is used to determine whether the grid cell contained the object to be analyzed. In the present example, the input images were highlighted and contoured in advance, thus, the conventional Tiny YOLO was optimized, thereby improved the identifying efficiency, which led to a reduction in the operating costs. In detail, since the input image of each RTI was processed to be the "full bleed image" and set to be in a pre-determined pixels size, the number of anchor boxes for operation was minimized to one, and the size of anchor boxes was set to be 7×7 grid cells. Accordingly, the machine learning network only needed to predict one bounding box with a full size of the input image. The detail parameters for optimizing Tiny YOLO are listed in Table 2.

TABLE 2

The parameters for the optimized Tiny YOLO network

|  | Conventional Tiny YOLO network | Optimized Tiny YOLO network |
| --- | --- | --- |
| Image input size (pixels) | 416 × 416 | 224 × 224 |
| Data augmentation | Saturation: 50% Exposure: 50% | Saturation: 100% Exposure: 100% |
| Bounding boxes for anchor | 5 | 1 |
| Sizes of bounding boxes | 1.08 × 1.19 3.42 × 4.41 6.63 × 11.38 9.42 × 5.11 16.62 × 10.52 | 7 × 7 |
| Jitter parameter | 0.2 | Off |
| Multi-scale training function | On | Off |

In practice, the optimized Tiny YOLO was programmed in a machine learning processor equipped with high resolution graphic card, GEFORCE® GTX 1080 (NVIDIA, USA). The machine learning processor executed the deep learning process by a training model of the optimized Tiny YOLO. The training criteria for the optimized Tiny YOLO is listed in Table 3.

TABLE 3

The training criteria for the optimized Tiny YOLO

| Image input size (pixels) | 224 × 224 |
| --- | --- |
| Training samples augmentation | Off |
| Pre-trained model | Non |
| Batch size | 8 |
| Maximum epochs | 100 epochs (i.e., 168,800 times of iterative) |
| Trained weights | 1 epoch (i.e., 1,688 times of iterative) |

Example 2 Evaluating the Medication Sorting Efficiency of a Pharmaceutical Management System Implementing Machine Learning Based on the Medication Library of Example 1

Processed and Combined Images

In order to verify the visual recognition efficiency for the RTIs of the present disclosure, both the raw images of medication (non-processed and non-combined) and the RTIs (processed and combined) were input into the training model (the optimized Tiny YOLO) for deep learning. Training results are summarized in Table 4. According to the data in Table 4, the "highlighted" images of the present disclosure was highly efficient in training visual recognition, as compared to raw images that had not been processed. The higher the F1-score of the training, the higher the efficiency of the deep learning network in the visual recognition of package images. The RTIs that had been processed to the RTT also significantly increased the training efficiency, as compared to those images that had not been processed.

TABLE 4

The comparison between non-processed images and RTIs

|  | Experiment groups | | |
| --- | --- | --- | --- |
|  | Group I | Group II | Group III |
|  | Image types | | |
|  | Non-processed images (front side) | Non-processed images (back side) | Processed images (RTIs) |
| Training time (min) | 362 | 462 | 273 |
| Epochs | 65 | 83 | 48 |
| Precision (%) | 77.03 | 89.39 | 99.83 |
| Recall | 67.44 | 87.68 | 99.83 |
| F1-score | 65.39 | 86.48 | 99.78 |

Optimized Learning Model

Another comparison was conducted to verify the efficacy of the present training model. Two conventional deep learning models, ResNet 101 and SE-ResNet 101, were utilized to build the training model with the RTIs. The comparison results are summarized in Table 5.

TABLE 5

The comparison between optimized system and conventional system

|  | Experiment groups | | |
| --- | --- | --- | --- |
|  | Group I | Group II | Group III |
|  | Training model (algorithm) | | |
|  | Optimized Tiny YOLO | ResNet 101 | SE-ResNet 101 |
| Training time (min) | 273 | 975 | 1728 |
| Epochs | 48 | 39 | 32 |

TABLE 5-continued

The comparison between optimized system and conventional system

| | Experiment groups | | |
|---|---|---|---|
| | Group I | Group II | Group III |
| | Training model (algorithm) | | |
| | Optimized Tiny YOLO | ResNet 101 | SE-ResNet 101 |
| Precision (%) | 99.83 | 99.84 | 99.98 |
| Recall | 99.83 | 99.83 | 99.98 |
| F1-score | 99.78 | 99.79 | 99.97 |

The comparing results in tables 4 and 5 demonstrate that the RTIs processed by the present method to fit a RTT would increase the training efficiency, in particular when the images were processed by the optimized Tiny YOLO model, in which the training time decreased significantly. All the 18,000 RTIs were inputted into the training model, such that the medication library of the present disclosure was built by executing the optimized Tiny YOLO model. The medication library and the deep learning network were further stored in an embedded system for further application.

Application for Real-Time Medication Identification

In operation, a random medication was chosen and placed in a designed chamber equipped with a transparent board made by glass. Light sources were disposed around the transparent board for illumination, and two BRIO webcams (Logitech, USA) were individually disposed over the transparent board to ensure the vision field of which encompassed the entire area of the board. On the other hand, the built medication library had been stored in the real-time embedded computing device, JETSON™ TX2 (NVIDIA, USA) in advance. JETSON™ TX2, which is termed "a developer kit," includes memories, CPU, GPU, USB ports, web antennas and some other computing elements, thereby enabling image processing and machine learning steps to be conducted in the same device. In operation, the webcams were connected to JETSON™ TX2 by USB cables, such that the image of the sides of the chosen medication were simultaneously transferred to the processor in real-time. Two raw images of the blister package of the chosen medication were processed to one RTI, afterwards the RTI was subjected to the learning model Tiny YOLO programmed in JETSON™ TX2 of which the speed of visual recognition could be up to about 200 FPS. The time cost for whole procedure (i.e., from image capturing to visual identification) is about 6.23 FPS. The outcome of the identification will be presented in real-time on an external display device, such as a computer screen or a mobile user interface. Hence, an external user can obtain identification results almost at the same time that the medication is delivered into the chamber.

Furthermore, in order to verify that the present system decrease the possibility of men-made errors during medication dispensing, another comparison was conducted. For example, Lorazepam, an anti-anxiety drug, is the most misidentified drug due to high appearance similarities with other drugs when being dispensed. Firstly, the RTI of Lorazepam was inputted into the present system to compare with all medications in the library. After computing, learning model proposed several candidate mediations which might be possibly misidentified based on appearance similarity analyzed by the learning model. The candidate lists can help clinical stuffs double check whether the chosen medication is correct. Therefore, by the medication management system of the present disclosure, the accuracy for drug dispensing can be improved and the human errors can be minimized for ensuring patient safety.

To sum up, the method and the system for medication management according to the present disclosure can achieve the forgoing object by applying image processing steps to combine images into one and deep learning model in a real-time manner. The advantages of the present disclosure are not only efficiently processing raw images regardless of the orientation of objects (i.e., medications), but also increasing the accuracy for medication classification via their appearances.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A computer implemented method for building a medication library, comprising,
    (a) receiving a plurality of raw images of a blister package of a medication;
    (b) juxtaposing two of the plurality of raw images to produce a juxtaposed image, in which the two raw images are different from each other;
    (c) processing the juxtaposed image to produce a reference image; and
    (d) establishing the medication library with the aid of the reference image,
    wherein the step (b) comprises,
        (b-1) respectively processing the plurality of raw images to produce a plurality of first processed images respectively having defined contours,
        (b-2) identifying the corners of each defined contours of the first processed images to determine the coordinates thereof;
        (b-3) rotating each of the first processed images of the step (b-1) based on the determined coordinates of the step (b-2) to produce a plurality of second processed images; and
        (b-4) juxtaposing any two of the second processed images to produce the juxtaposed image of the step (b); and
    wherein the juxtaposed image produced in the step (b) fits a fixed template.

2. The computer implemented method of claim 1, further comprising capturing the plurality of raw images of the blister package of the medication simultaneously prior to the step (a).

3. The computer implemented method of claim 1, wherein each of the plurality of raw images of step (b-1) are subjected to treatments of, (i) a grayscale-converting treatment, (ii) a noise-reduction treatment, (iii) an edge-identification treatment, (iv) a convex hull treatment, and (v) a contouring treatment.

4. The computer implemented method of claim 1, wherein the step (b-2) is carried out by a line transforming algorithm or a centroid algorithm.

5. The computer implemented method of claim 1, wherein the juxtaposed image comprises the image of both sides of the blister package of the medication.

6. The computer implemented method of claim 1, wherein the step (c) is carried out by a machine learning algorithm.

7. A computer implemented method for identifying a medication via its blister package, comprising,
- (a) obtaining the front and back images of the blister package of the medication simultaneously;
- (b) juxtaposing the front and back images of the step (a) to produce a candidate image that fits the fixed template;
- (c) comparing the candidate image with a reference image of a medication library established by the method of claim 1; and
- (d) outputting the result of the step (c).

8. The computer implemented method of claim 7, wherein the step comprises,
- (b-1) respectively processing the front and back images of the step (a) to produce two first processed images respectively having defined contours;
- (b-2) identifying the corners of each defined contours of the two first processed images to determine the coordinates thereof;
- (b-3) rotating each of the two first processed images of the step (b-1) based on the determined coordinates of the step (b-2) to produce two second processed images; and
- (b-4) combining the two second processed images of the step (b-3) to produce the candidate image of the step (b).

9. The computer implemented method of claim 8, wherein the front and back images of the step (b-1) are respectively subjected to treatments of, (i) a grayscale-converting treatment, (ii) a noise-reduction treatment, (iii) an edge-identification treatment, (iv) a convex hull treatment, and (v) a contouring treatment.

10. The computer implemented method of claim 8, wherein the step (b-2) is carried out by a line transforming algorithm or a centroid algorithm.

11. The computer implemented method of claim 7, wherein the step (c) is carried out by a machine learning algorithm.

12. The computer implemented method of claim 7, further comprising transferring the candidate image into the medication library prior to the step (c).

13. A pharmaceutical management system, comprising,
- an image capturing device configured to capture a plurality of images of a package of a medication;
- an image processor programmed with instructions to execute a method for producing a candidate image, wherein the method comprises,
  - (1) respectively processing the plurality of images of the package of the medication to produce a plurality of first processed images respectively having defined contours;
  - (2) identifying the corners of each defined contours of the first processed images to determine the coordinates thereof;
  - (3) rotating each of the first processed images based on the identified coordinates of the step (2) to produce a plurality of second processed images; and
  - (4) juxtaposing two of the second processed images of the step (3) to produce the candidate image, in which the two second processed images are different from each other; and
- a machine learning processor programmed with instructions to execute a method for comparing the candidate image with a reference image of a medication library established by the method of claim 1.

14. The system of claim 13, wherein the image capturing device comprises,
- a transparent board on which the medication is placed; and
- two image-capturing units individually disposed above each side of the transparent board.

15. The system of claim 13, wherein each of the plurality of images of step (1) are subjected to treatments of, (i) a grayscale-converting treatment, (ii) a noise-reduction treatment, (iii) an edge-identification treatment, (iv) a convex hull treatment, and (v) a contouring treatment.

16. The system of claim 13, wherein the step (2) is carried out by a line transforming algorithm or a centroid algorithm.

17. The system of claim 13, wherein the method for comparing the candidate image with a reference image of a medication library is carried out by a machine learning algorithm.

* * * * *